(12) United States Patent
Rubenstein et al.

(10) Patent No.: US 6,627,811 B2
(45) Date of Patent: Sep. 30, 2003

(54) CABLE PROTECTIVE SHIELD ASSEMBLY

(75) Inventors: Brandon Rubenstein, Loveland, CO (US); Eugene A Miksch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/918,976

(22) Filed: Jul. 31, 2001

(65) Prior Publication Data

US 2003/0024718 A1 Feb. 6, 2003

(51) Int. Cl.[7] ................................................. H05K 9/00
(52) U.S. Cl. ................ 174/35 R; 174/72 A; 174/138 E
(58) Field of Search .................... 174/35 R, 35 MS, 174/52.1, 72 A, 138 E, 138 G, 50; 361/818, 816, 826

(56) References Cited

U.S. PATENT DOCUMENTS

| | | | | |
|---|---|---|---|---|
| 3,830,954 A | * | 8/1974 | Caudill | 174/35 MS |
| 4,550,960 A | * | 11/1985 | Asick et al. | 439/108 |
| 4,728,160 A | * | 3/1988 | Mondor et al. | 312/236 |
| 5,139,850 A | * | 8/1992 | Clarke et al. | 428/192 |
| 5,750,924 A | * | 5/1998 | Sonntag et al. | 174/50 |

* cited by examiner

Primary Examiner—Dean A. Reichard
Assistant Examiner—W. David Walkenhorst

(57) ABSTRACT

A cable protective shield assembly is provided for managing the position of computer cables. The assembly includes a base plate having a number of spacers formed on one surface, a cover plate having a number of bores extending through the plate at locations designated in alignment with the spacers of the base plate, and a corresponding number of fasteners for insertion through the bores of the cover plate into the spacers of the base plate to rigidly couple the plates together. The height of the spacers create a standoff distance between the base plate and cover plate defining a space for computer cables to extend. The spacers are also positioned across the base plate surface as to create specific passageways for the cables to be located. One or more ports can be placed along the perimeter of the cover plate to allow access to cable connectors while generally maintaining the organized position of the cables. The assembly shields the cables from electromagnetic energy and filters noise superimposed on the cables by electromagnetic energy present in the chassis.

19 Claims, 3 Drawing Sheets

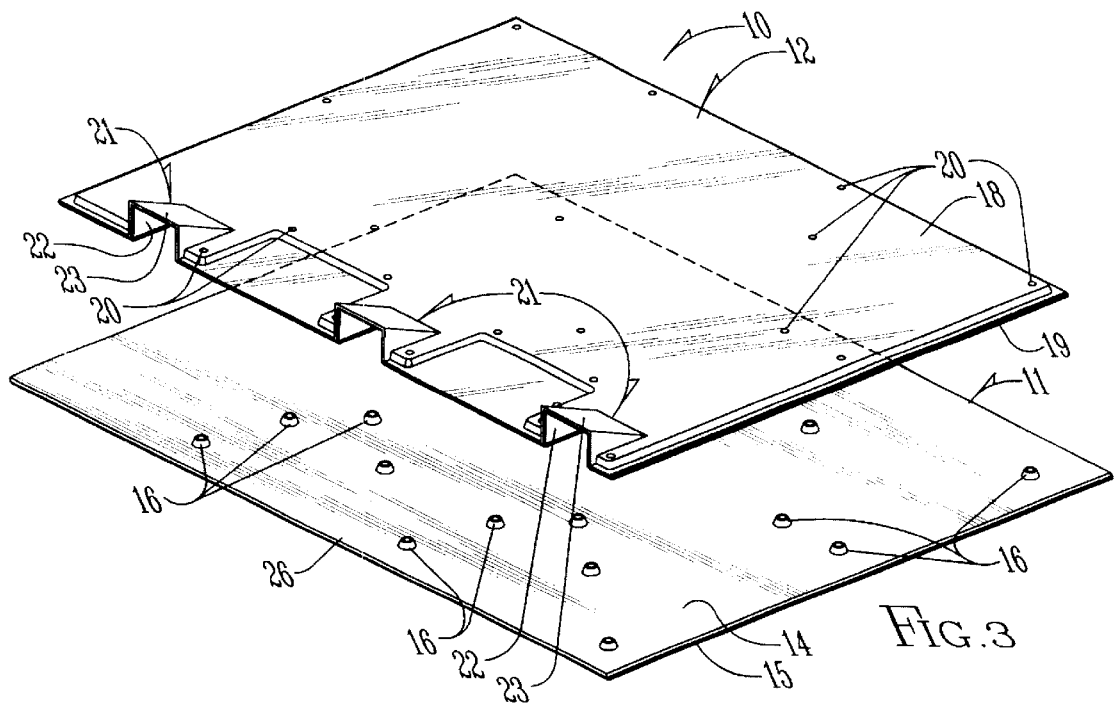
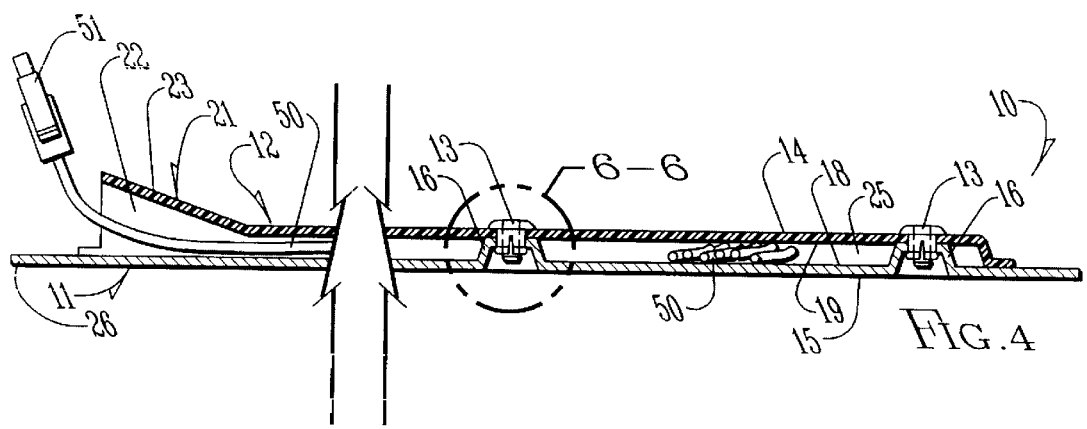

CABLE PROTECTIVE SHIELD ASSEMBLY

BACKGROUND OF THE INVENTION

This invention relates generally to an apparatus for covering a surface of a computer, and, more particularly, to an apparatus for managing and protecting computer cables extending within a computer chassis while mitigating electromagnetic waves both internal of the system and conducted as a noise signal superimposed upon an intended signal.

DESCRIPTION OF THE RELATED ART

Typical computer systems have a series of cables that are designed to carry commands and data between separate components, including peripheral devices. These cables facilitate the interfacing of a central processing unit (CPU) and related circuitry, such as a motherboard, with devices that are to be controlled. Additionally, cables are used to connect a single computer or computer terminal with other computers, such as servers.

Managing the position of a number of cables is typically carried out by cable clips, nylon cable ties or tape that position the cables adjacent to a computer frame. Cable clips often allow several cables to be bundled together to facilitate better organization of the cables along a computer frame. These devices, however, suffer from many disadvantages. First, bundling cables makes it difficult to locate and access a specific cable for servicing. Second, using cable clips, cable ties, or tape often gives a system an unfinished appearance as a group of jumbled cables extends internally along the frame. Additionally, these devices may not fully protect the cables from damage due to exposure, and often fail to correctly position the cables at ideal locations in relation to the computer system components.

Conduits have been used to arrange the cables, however, the use of conduits increases the space needed around the computer system to accommodate the cables and limits the positioning of the cables to a predefined path. Accessibility of the cables also becomes more difficult since the conduit must be removed and the specific cable located prior to servicing.

Particularly in computer server applications, a further concern arises with controlling electromagnetic waves within the chassis. The Federal Communication Commission strictly regulates the amount of electromagnetic wave emissions radiating from a product. Cables that communicate with or supply power to external devices compromise the electromagnetic compatibility (EMC) containment feature by extending through the EMC enclosure and/or by conducting the electromagnetic waves from sources within the chassis and radiating this electromagnetic energy outside the chassis. One known solution is to use a filtered connector. Filtered connectors contain an electronic circuit that shunts the high-frequency electromagnetic waves to the EMC enclosure and permits the intended electronic signals to pass unimpeded. These connectors, however, are expensive and required for any breach of the EMC enclosure even for applications that do not require a connector.

Another known solution involves passing the cables through a cylindrically shaped ferrite bead. The ferrite bead introduces an inductance for high-frequency alternating currents without affecting the desired direct currents on the cables. Ferrite conduits are costly, space-consuming, and the physical size of the ferrite bead makes routing of the cable through the chassis more difficult during assembly.

Thus, what is needed is an apparatus for efficiently and conveniently managing the position of computer cables adjacent to a computer system frame while mitigating electromagnetic waves both internal of the system and conducted as a noise signal superimposed upon the intended signal. Such an assembly should control these electromagnetic waves internally of the chassis to prevent these waves from subsequently leaving the chassis and further serves to improve the product performance. Such an apparatus should be easy to secure to the desired component of a computer system by generally restricting the position of the cables such that the connector is adjacent the component, and easy to remove to allow access to the cables. As another feature, the apparatus should be configured for different sizes of cables and should allow some freedom of movement for adjusting the position of the cables relative to components of the computer system. Further, the apparatus should ensure that cables are located out of the way of, and protected from, other objects that could damage or become entangled with the cables.

SUMMARY OF THE INVENTION

It is therefore an object of the present invention to provide a cable protective shield assembly for attachment to a computer system to manage the position of computer cables. It is another object of the present invention to provide such an assembly with spacers configured to provide a standoff distance or spacing for housing a series of computer cables and to provide a means of positioning and guiding the cables to desired locations. It is a further object of the present invention to provide fasteners to facilitate secure placement of the shield assembly and ease in removal of the cover plate to access the cables. It is another object of the present invention to provide such a cable assembly that mitigates electromagnetic waves and filters noise from the series of cables. It is yet another object of the present invention to provide such an assembly that is neat in appearance and protects the cables from contacting potentially damaging objects.

A cable protective shield assembly of the present invention meets these objects by managing the position of cables of a computer system and providing control for electromagnetic waves internal of the chassis. The assembly comprises a base plate section, a cover plate substantially aligned with the base plate and positioned parallel to the base plate at a stand-off distance, and fasteners for coupling the cover plate to the base plate.

The perimeter of the base plate is configured for attachment to a computer system. In one embodiment, a number of spacers are formed on the upper surface of the base plate presenting a generally flat surface parallel to the base plate surface. These spacers are located at various positions to facilitate support of the cover plate at a desired distance above the base plate and are adapted for receiving a fastener. Another function of the spacers is to restrict the movement of computer cables in a two-dimensional plane to specific paths along the top surface of the base plate.

The cover plate is sized and configured to overlay the base plate to ensure the computer cables are confined to locations between the base and cover plates. Thus, the cover plate restricts the movement of the cables perpendicularly away from the base plate. A number of bores extend through the cover plate at specific locations designated to be aligned with the spacers of the base plate when the cover plate is properly positioned. The cover plate is also provided with one or more ports. The ports serve as a location for exposing a cable connector for connecting to various computer system components. Additionally, the ports restrict the movement of the cable connector by preventing it from sliding under the cover plate.

A corresponding number of fasteners are provided for insertion through the bores of the cover plate into the spacers of the base plate to connect both plates. The fasteners also ensure that the cover plate rests against the spacers at the desired standoff distance. The fasteners are ideally of the kind that are easy to install and remove as desired to access the cables located between the base plate and cover plate.

The present invention provides a cable protective shield assembly that is easy to install on a typical computer system and facilitates the management of computer cables to desired locations. Within the assembly, the cables are allowed some freedom of movement between the spacers such that it is unnecessary to precisely position the cables. The shield assembly further provides a control for electromagnetic waves of the chassis by conducting electromagnetic waves to ground for the series of cable. Additionally, the openings of the cover plate provide for convenient access to the cable connectors at desired locations around the computer frame.

Other advantages and components of the present invention will become apparent from the following description taken in conjunction with the accompanying drawings, which constitute a part of this specification and wherein are set forth exemplary embodiments of the present invention to illustrate various objects and features thereof.

BRIEF DESCRIPTION OF THE DRAWINGS

FIG. 3 is an exploded view of the base plate and cover plate of the present invention.

FIG. 4 is a cross-sectional view of the present invention taken along line 4—4 showing the connection between the base plate and cover plate defining paths for computer cables.

DETAILED DESCRIPTION OF THE INVENTION

Figure 1:
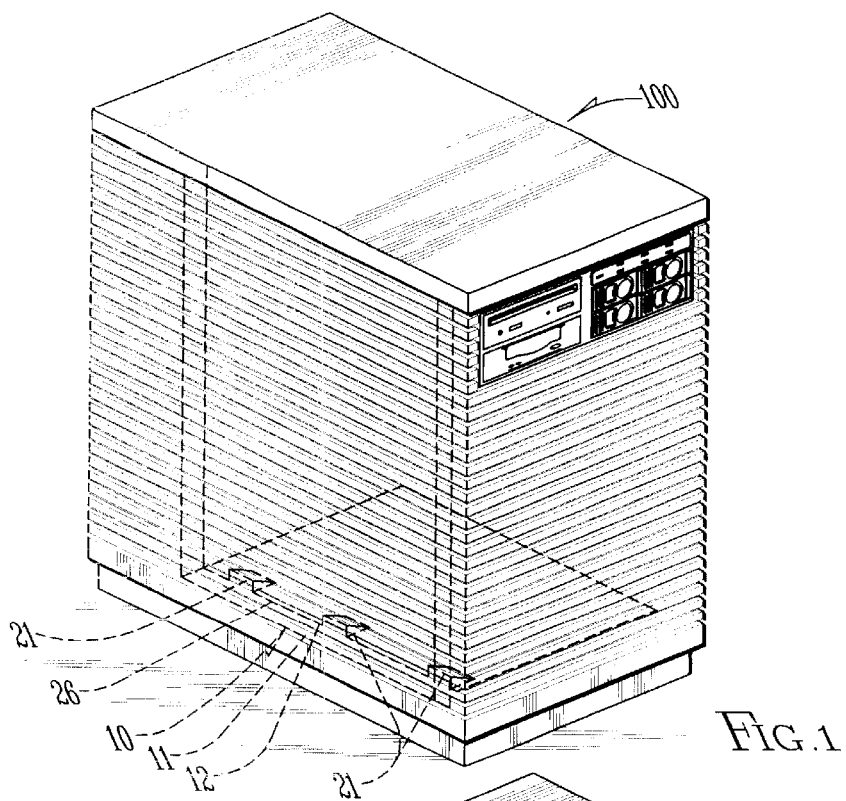
FIG. 1 is a perspective view of a computer system frame showing the cable protective shield of the present invention.
Figure 2:
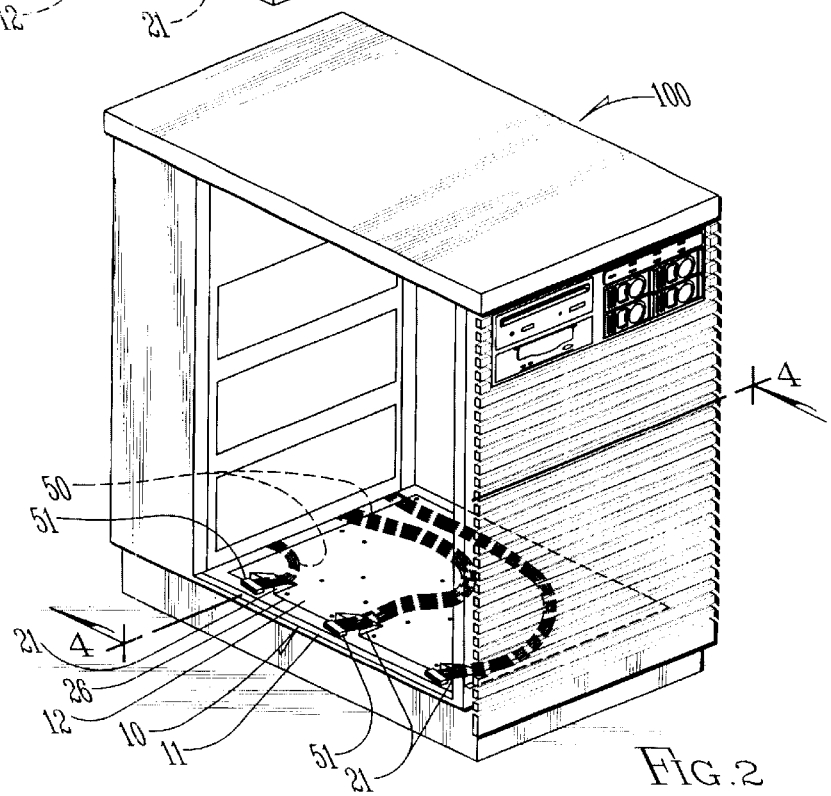
FIG. 2 is a perspective view of a computer system frame with removed side panels showing the attached base plate of the present invention and configuration of computer cable.
Figure 5:
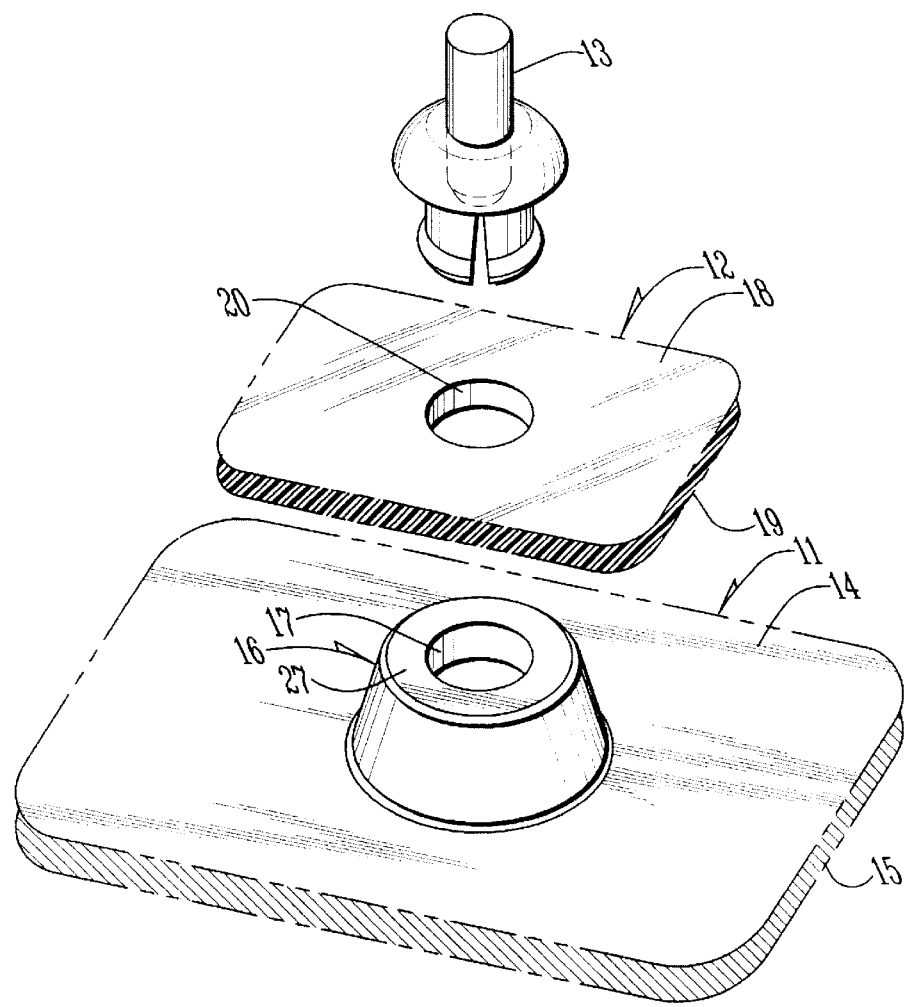
FIG. 5 is an exploded close-up view of the present invention showing the alignment of the base plate spacers, cover plate bores, and the fasteners.
Figure 6:
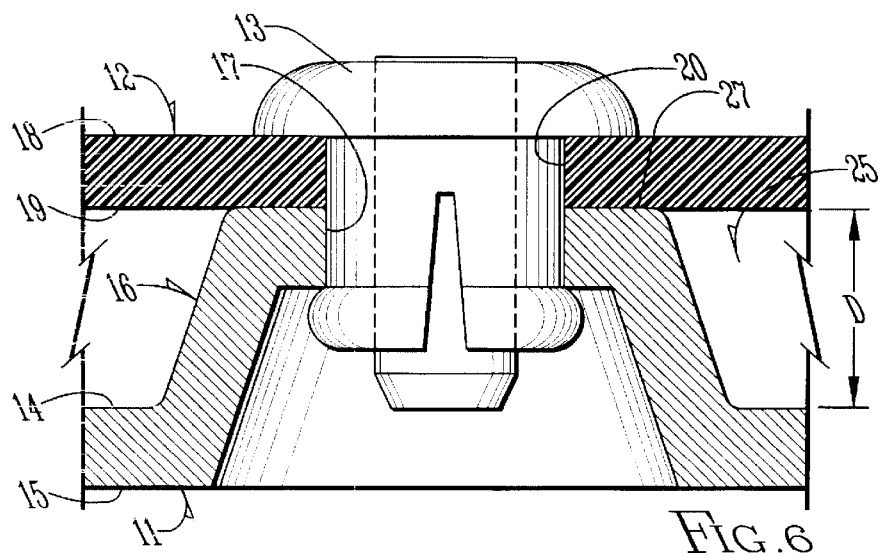
FIG. 6 is a cross-sectional view taken along line 6—6 showing a close-up of the base plate coupled to the cover plate with a fastener.

A protective shield assembly in accordance with the present invention is indicated generally at 10. As shown in FIGS. 3 and 4, the assembly 10 comprises a base plate 11, a cover plate 12, and fasteners 13 for coupling the base plate 11 to the cover plate 12 at a standoff distance to allow for the passage of computer cables 50. The assembly 10 provides a secure and organized arrangement for positioning computer cables adjacent to a computer housing and mitigates electromagnetic waves internal of the system and/or conducted as a noise signal superimposed upon the intended signal.

The base plate 11 is generally a rectangular, planar member having a top surface 14 and a bottom surface 15. The base plate 11 is connected to a computer frame 100 by any means known in the art, such as by fasteners, and is electrically grounded to the ground of computer frame 100. Preferably, the connection between the base plate 11 and the frame 100 is along or near the perimeter of the base plate 11 so as to provide as little interference as possible with computer cables 50 that are placed on the base plate top surface 14. Alternatively, the floor of a computer chassis can serve as the base plate for the present invention.

The base plate 11 is formed with a plurality of spacers 16 disposed across the base plate top surface 14 at various locations to provide for a standoff distance D between the base plate 11 and the cover plate 12. The spacers 16 are generally of a uniform height such that the cover plate 12 placed on the spacers 16 is in substantially parallel alignment with the base plate 11. Additionally, the spacers 16 can be of any configuration for providing a raised platform support for the cover plate 12, such as block, cylinder, half-sphere, or other known shape. Preferably the spacers 16 are inverted, cone-shaped protrusions having a flat end surface 27 parallel to the base plate top surface 14 and having a bore 17 extending at least partially therethrough. In an alternative embodiment, the spacers 16 are male connector members which receive female members around the perimeter of the spacers 16 in an interference fit. Preferably, the base plate is constructed of metal for providing electromagnetic wave mitigation as will be further discussed hereinafter. Alternatively, if electromagnetic wave mitigation is not of concern, materials such as plastics may be used to form the base plate 11. More specifically, the ideal materials would be those in which the spacers 16 can be easily extruded into the base plate top surface 14.

The cover plate 12 is of a configuration similar to that of the base plate 11, and is comprised of a generally rectangular, planar member substantially co-extensive with base plate 11. The cover plate 12 has a top surface 18 and a bottom surface 19, and is designed to mate with the base plate 11 to form a uniform assembly connected to a computer frame 100. Materials used for the cover plate 12 are similar to the base plate 11, including metals and plastics. Preferably, the material is a transparent plastic such that computer cables 50 placed in between the cover plate 12 and the base plate 11 can be easily seen when assembling the present invention on a computer housing 100.

To facilitate the proper placement of the cover plate 12 adjacent to the base plate 11 at the standoff distance, a plurality of bores 20 are formed therein. The bores 12 extend through the cover plate 12 and are positioned to be aligned with the spacer bores 17 of the base plate 11. Fasteners 13 can be provided for insertion through the cover plate bores 20 into the spacer bores 17 to couple the cover plate 12 to the base plate 11 at the distance provided by the spacers 16. Preferably rivet-type fasteners are used to releasably secure the cover plate 12 and base plate 11 to facilitate access to computer cables 50 located between the cover plate 12 and the base plate 11. The fasteners 13 can be made of metal, but are preferably formed of plastic for ease of manufacture and assembly of the present invention.

As an alternative arrangement to using cover plate bores 20, the cover plate bottom surface 19 can be provided with a plurality of female connector members protruding outwardly from the bottom surface 19 and are configured to be aligned with, and slide over, the male connector members of the base plate 11 in an interference fit. This provides another embodiment for releasably securing the cover plate 12 and base plate 11. In a reverse configuration, the cover plate bottom surface 19 can be provided with a plurality of male connector members extending away from the bottom surface 19 and configured to be aligned with, and slide in, the female connector members of the base plate 11 in an interference fit.

The cover plate 12 also has a number of ports 21 formed on the top surface 18 that define an opening through which the cable connectors 51 extend. The ports 21 are formed of two parallel, spaced apart walls 22 extending upwardly from the cover plate top surface 18 and an upper lid 23 extending across the raised walls 22. The ports are configured to extend gradually upwardly away from the cover plate top surface 18, as shown is FIG. 3. The openings 21 are preferably located near the perimeter edge 24 of the cover plate 12 to allow for easy access to computer cables 50 and connectors 51 when additional computer frames 100 or chassis are placed on top of the cover plate 12. Ideally, one port 21 is provided for each cable connector 51. This configuration is ideal because is allows for freedom of movement of the computer cables 50 within the protective assembly 10 as needed to extend the cables connectors 51 to other devices to be interfaced. At the same time, ports 21 are sized to restrict the cable connectors 51 from sliding between the base plate 11 and cover plate 12 where the connectors would not be readily accessible. Thus, the ports 21 restrict the positions from which the cable connectors are accessible inside a computer frame only to desired locations.

The assembly 10 defines a series of paths 25 in which computer cables 50 can be placed. The spacers 16 of the base plate 11 and corresponding bores 20 of the cover plate are positioned to provide guiding structure by which cables 50 can be organized along a computer chassis or housing 100. Ideally, the paths 25 are wide enough such that the cables have some freedom of movement or clearance when the location of the cable connectors 51 is adjusted by a user, but sufficiently narrow as to keep the cables 50 from sliding transversely completely across the base plate 11 or becoming entangled with other cables 50.

Additionally, the spacers 16 are configured to be of a sufficient height above the base plate top surface 14 to create a clearance that allows for adjustment of the cable connectors 51 and cables 50 without applying undue force.

The assembly 10 provides mitigation for electromagnetic waves present within the chassis. The assembly 10 may be constructed to provide different levels of electromagnetic wave mitigation, depending on the system's needs. In one configuration, the base plate 11 is constructed of metal and is electrically grounded to the EMC enclosure. The cover plate is made of plastic. In this configuration, the routed cables and the metal base plate are capacitively coupled. Specifically, the wires internal of the cables and the metal of the base plate serve as conductors and the insulation of the cables serves as the nonconductor. The high-frequency noise superimposed on the wire by the electromagnetic energy in the chassis is routed to the base plate 11 and then conducted to ground. The low-frequency intended signal continues along the cabling to the desired endpoint. The electromagnetic wave mitigation is maximized in this configuration by securing the cabling adjacent to the base plate to minimize the separation between the conductive wires and base plate.

If the electromagnetic wave mitigation needs are greater, a higher degree of control is available by the assembly 10 of the present invention. The cover plate 12 may also be formed of metal and electrically grounded to the EMC enclosure. This effectively doubles the area shared by the conductor in the routed cables and the conductive base plate 11 and cover plate 12 and thereby doubles the effective capacitive coupling.

The cover plate 12 of the present invention provides the additional benefit of a protection shield over the computer cables 50 such that potentially damaging objects, such as liquids, corrosives, or sharp or heavy objects, do not come into direct contact with the cables 50. Additionally, the combination of paths 25 formed between the cover and base plates 11, 12 and the ports 21 guide the cables 50 and cable connectors 51 to locations that are out of the way of other objects, such that the cables 50 do not become tangled or otherwise interfere with such objects.

In operation, a base plate 11 is formed with spacers 16 at desired locations along the top surface 14. The base plate is secured to a computer frame 100 to form a chassis plate. Alternatively, spacers 16 are formed directly on the base of the computer system frame. A series of computer cables 50 are then lain across the plate top surface 14 between the spacers 16 in paths 25 that extend from one location on the top surface 14 to perimeter edge locations 26 of the base plate 11 where the cable connectors 51 are placed. A cover plate 12 configured with bores 20 is then placed over the base plate 11 and the computer cables 50 such that the bores 20 are aligned with the spacers 16 and the cover plate openings 21 overlie the cable connectors 51. Fasteners 13 are inserted through the cover plate bores 20 and into the spacer bores 17 to secure the cover plate 12 to the base plate 11. Cable connectors 51 are left exposed through ports 21 and can be easily interfaced to other computer components or devices. Additionally, depending on the length of cable 50 available, the cable connectors 51 can be pulled further out from the assembly to allow for interfacing with devices located remotely from the present invention 10.

In addition to the applications described above, the current invention also provides a means of securely positioning cables besides merely computer cables 50. For example, power cables or any other type of wire or cable can be safely extended between two plates in an organized fashion, providing freedom of movement through a standoff distance for interfacing the cable with a variety of other devices.

From the foregoing information, it should now be obvious that the cable protection shield assembly 10 provides a safe, aesthetic, organized, easier to assemble, and easier to maintain solution for managing computer cables 50 adjacent to a computer frame. The assembly 10 further provides an effective electromagnetic energy shield and filter for the cabling 50 routed therein. The present invention also facilitates quick assembly to set the position of cables 50 and quick disassembly to allow a user to adjust or change cables 50 as desired.

It is to be understood that the present invention can provided with a variety of structure for coupling the base plate 11 and the cover plate 12 such as a friction fit with male and female connectors disposed on opposing base and cover plates 11, 12, so long as spacers are provided to form a standoff distance for the passage of cables. Reversing the fastening structure the base plate 11 and cover plate 12 such that the spacers extend downwardly from the cover plate is fully contemplated by the present invention. Additionally, the present invention is not limited to configurations where the cover plate 12 vertically overlies the base plate 11 such that the plates are horizontally mounted on a computer frame 100, but also includes vertical mounting of the plates 11, 12 whereby the plates are horizontally setoff from each other at the standoff distance. Furthermore, while certain forms of the present invention have been illustrated and described herein, it is not to be limited to the specific forms or arrangement of parts described and shown.

What is claimed is:

1. An assembly for managing and shielding cables routed within a chassis and attenuating electromagnetic waves emanating from the chassis, the assembly comprising:

a base plate having a top surface and a bottom surface, the base plate being formed of a conductive material;

a cover plate having a top surface and a bottom surface, the cover plate being spaced from and in substantially parallel alignment with the base plate; and means for interconnecting the base plate and the cover plate that define paths for cables to be routed therethrough and place the cables adjacent to the base plate and traveling along the top surface thereof, the means for interconnecting the base plate and the cover plate further defining a standoff distance to provide clearance between the cover plate and the base plate for cables to move freely therein.

2. The assembly of claim 1, wherein the means for interconnecting the base plate and the cover plate comprises at least one spacer extending away from the top surface of the base plate and at least one bore extending through the cover plate in alignment with the spacers of the base plate as the base plate and cover plate are interconnected.

3. The assembly of claim 2, wherein the at least one spacer includes a bore therein, and wherein the means for interconnecting the base plate and the cover plate further comprises at least one connector configured to be inserted through the at least one bore of the cover plate and received within the at least one spacer of the base plate to releasably secure the cover plate to the base plate.

4. The assembly of claim 2, wherein the at least one spacer comprises a plurality of spacers positioned to form at least one path on the top surface of the base plate.

5. The assembly of claim 2, wherein the cover plate further comprises at least one port extending from a perimeter edge of the top surface of the cover plate to facilitate access to cable connectors.

6. The assembly of claim 5, wherein the at least one port is of a sufficiently small size as to prevent a cable connector from traveling between the base plate and the cover plate when the cover plate is mounted to the base plate.

7. The assembly of claim 2, wherein the at least one connector is a rivet configured for insertion through the bores of the cover plate and into the spacers of the base plate.

8. The assembly of claim 2, wherein the cover plate and the at least one connector are formed of plastic.

9. The assembly of claim 1, wherein the base plate is a floor for the chassis.

10. The assembly of claim 1, wherein the means for interconnecting the base plate and the cover plate comprises a series of male members formed on one of the base plate and cover plate, and a series of female members aligned with and configured to receive the series male members on the other of the base plate and cover plate.

11. The assembly of claim 10, wherein the interconnection between the series of male members and female members define a standoff distance between the cover plate and base plate.

12. An assembly for managing and shielding cables routed within a chassis and attenuating electromagnetic waves emanating from the chassis, the assembly comprising:

a base plate having a top surface and a bottom surface, the base plate being formed of a conductive material;

a cover plate having a top surface and a bottom surface, the cover plate being spaced from and in substantially parallel alignment with the base plate; and at least one spacer extending from the top surface of the base plate and at least one bore extending through the cover plate in alignment with the at least one spacer of the cover plate as the base plate and cover plate are interconnected that define paths for cables to be routed therethrough and place the cables adjacent to the base plate and traveling along the top surface thereof, the at least one spacer defining a standoff distance sufficient to provide clearance between the cover plate and the base plate for cables to move freely therein.

13. An assembly for shielding and filtering cables routed therein from electromagnetic waves emanating from inside a chassis, the cables having wiring surrounded by insulation, the electromagnetic waves superimposing a noise on the signal in the wiring of the cable, the assembly comprising:

a base plate having a top surface and a bottom surface, the base plate being formed of an electrically conductive material and being electrically grounded;

a cover plate having a top surface and a bottom surface, the cover plate being spaced from and substantially aligned with the base plate such that the cables are routed therebetween; and means for interconnecting the base plate and cover plate that secure the cables adjacent to the base plate and traveling along the top surface thereof to capacitively couple the wiring of the cables and the base plate and thereby attenuate the noise superimposed on the wiring in the cable.

14. The assembly of claim 13, wherein the cover plate is formed of an insulative material to shield the cables from electromagnetic waves.

15. The assembly of claim 13, wherein the means for interconnecting the base plate and the cover plate minimizes the separation between the wiring of the cables and the base plate.

16. The assembly of claim 13, wherein the cover plate is made of an electrically conductive material and is electrically grounded, and wherein an insulator is mounted between said cover plate and said base plate whereby the assembly is capacitively coupled with the wiring of the cables.

17. The assembly of claim 13, wherein the cover plate and base plate are formed of metal.

18. A method for assembling a protective shield system comprising the steps of:

forming a metal base plate with a top surface and a bottom surface, the metal base plate being electrically grounded;

forming a cover plate with a top surface and a bottom surface;

positioning one or more cables on the top surface of the base plate such that the cables are located adjacent to the base plate;

providing a standoff distance between the base plate and the cover plate by forming at least one spacer on one of the base plate and the cover plate to afford clearance between the cover plate and the base plate for cables to move freely therein, placing the cover plate over the base plate and cables such that the cables are located adjacent to the base plate and traveling along the top surface thereof; and attenuating the electromagnetic waves present in a chassis by capacitive coupling.

19. The method of claim 18, further including the steps of:

filtering a noise superimposed on the cables by electromagnetic waves in the chassis.

* * * * *